United States Patent
Crosta et al.

(10) Patent No.: US 8,959,924 B2
(45) Date of Patent: Feb. 24, 2015

(54) AIRCRAFT TURBOFAN ENGINE

(75) Inventors: Franck Crosta, Leguevin (FR); Damien Prat, Colomiers (FR); David Grossein, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 1557 days.

(21) Appl. No.: 12/238,089

(22) Filed: Sep. 25, 2008

(65) Prior Publication Data
US 2009/0090095 A1 Apr. 9, 2009

(30) Foreign Application Priority Data
Oct. 8, 2007 (FR) .................................... 07 07037

(51) Int. Cl.
F02K 1/00 (2006.01)
F02K 3/06 (2006.01)
F02K 1/78 (2006.01)

(52) U.S. Cl.
CPC ... F02K 3/06 (2013.01); F02K 1/78 (2013.01); F05D 2210/30 (2013.01)
USPC ............... 60/772; 60/226.1; 60/230; 60/770; 239/265.19

(58) Field of Classification Search
USPC ............... 60/226.1, 262, 770, 771, 230, 772; 239/265.17, 265.19, 265.23
See application file for complete search history.

(56) References Cited

U.S. PATENT DOCUMENTS

| | | | | |
|---|---|---|---|---|
| 3,896,615 A | * | 7/1975 | Slatkin et al. | 60/204 |
| 4,410,150 A | * | 10/1983 | Lahti | 244/53 R |
| 5,402,964 A | * | 4/1995 | Wygnanski | 244/1 N |
| 5,727,382 A | * | 3/1998 | Chevalier et al. | 60/768 |
| 5,904,320 A | * | 5/1999 | Tindell | 244/110 B |
| 6,178,740 B1 | * | 1/2001 | Su et al. | 60/226.1 |
| 6,845,607 B2 | * | 1/2005 | Lair | 60/263 |
| 7,603,842 B2 | * | 10/2009 | Dujarric | 60/204 |
| 8,359,825 B2 | * | 1/2013 | Alvi | 60/204 |
| 8,371,104 B2 | * | 2/2013 | Wells et al. | 60/231 |
| 2007/0245739 A1 | * | 10/2007 | Stretton et al. | 60/728 |
| 2008/0217101 A1 | | 9/2008 | Crosta | |

FOREIGN PATENT DOCUMENTS

| | | |
|---|---|---|
| EP | 0 779 429 | 6/1997 |
| EP | 1 031 510 | 8/2000 |
| WO | 03/060311 | 7/2003 |
| WO | 2006/123035 | 11/2006 |

OTHER PUBLICATIONS

USAF Test Pilot School, Edwards Air Force Base, CA, vol. I—Performance Flight Testing, Chapter 6—Supersonic Aerodynamics, Jan. 1991, relevant pp. 6.39-6.51.*
Preliminary Search Report dated Jun. 13, 2008 w/ English translation.

* cited by examiner

*Primary Examiner* — Phutthiwat Wongwian
*Assistant Examiner* — Michael B Mantyla
(74) *Attorney, Agent, or Firm* — Dickinson Wright PLLC

(57) ABSTRACT

Disclosed is a turbofan engine for an aircraft. An inner fan cowl of the turbofan engine bounds an annular cold-stream duct proximate to the engine's central hot-stream generator, and an outer fan cowl bounds the annular cold-stream duct proximate to an outer nacelle cowl. An annular boss is provided along the inner fan cowl, with the annular boss having a rounded cross section that projects with respect to a smooth shape configuration of the inner fan cowl. The annular boss is configured to locally change speed of a cold stream flow in the annular cold-stream duct from a subsonic range to a supersonic range and to originate a first shockwave characteristic in a succession of shockwave characteristics, with the first shockwave characteristic being inclined from its origin toward the rear portion of the turbofan engine.

4 Claims, 4 Drawing Sheets

AIRCRAFT TURBOFAN ENGINE

FIELD OF THE INVENTION

The present invention relates to improvements to turbofan engines for aircraft, said improvements making it possible to increase the performance of said turbofan engines, and hence of said aircraft, particularly during cruise flight.

BACKGROUND OF THE INVENTION

More specifically, the invention relates to turbofan engines, described for example in document WO 2006/123035, of the type comprising, around a longitudinal axis:

a nacelle provided with an outer nacelle cowl and enclosing a fan generating the cold stream and a central generator generating the hot stream;

an annular cold-stream duct formed around said central hot-stream generator;

an outer fan cowl bounding said annular cold-stream duct in the region of said outer nacelle cowl;

a cold-stream outlet orifice whose edge, which forms the trailing edge of said nacelle, is defined by said outer nacelle cowl and by said outer fan cowl converging toward one another until they meet up;

an inner fan cowl, bounding said annular cold-stream duct in the region of said central hot-stream generator, and forming a projection toward the rear of said turbofan engine outside said cold-stream outlet orifice; and a cold-stream nozzle throat which is formed between said inner fan cowl and said outer fan cowl.

To make it possible in such a turbofan engine to minimize the performance losses due to the friction of said cold stream in said annular cold-stream duct, it is common practice to optimize the shape and the surface of said outer fan cowl, and also the shape and surface of said inner fan cowl. In particular, care is taken to ensure that the surfaces of said fan cowls are as smooth as possible.

Moreover, it is known (see, for example, European document EP 1 031 510) that, owing to the difference in the pressures at said cold-stream outlet orifice between said cold stream and the external aerodynamic flow around said nacelle, an alternating succession of supersonic speed zones and subsonic speed zones arises in said cold stream to the rear of said nozzle throat, the transitions between the supersonic speed zones and the subsonic speed zones being abrupt, non-progressive and without intermediate speed values and resulting from normal shocks, that is to say shocks which are virtually at right angles to the flow of said cold stream. As a result, said cold stream is the source of a shockwave propagating at the rear of said turbofan engine and having the shape of a broken line whose segments, (termed "characteristics" in aeronautical terminology) have a small inclination with respect to the flow of said cold stream and are reflected alternately on the slip surface between said cold stream and the external aerodynamic flow around said nacelle and on the slip surface between said cold stream and said hot stream.

Such a shockwave having normal shocks not only generates considerable noise (known as "shock cell noise") but also negatively impacts the performance of the turbofan engine and therefore that of the aircraft carrying it.

SUMMARY OF THE INVENTION

The object of the present invention is to overcome these disadvantages.

To achieve this, according to the invention, the turbofan engine of the type referred to above, in which the cold stream is the source of a shockwave propagating at the rear of said turbofan engine and constituted by a succession of characteristics alternately reflecting on the slip surface between said cold stream and the external aerodynamic flow around said nacelle and on the slip surface between said cold stream and said hot stream, is noteworthy in that said inner fan cowl comprises, around said longitudinal axis and in the vicinity of said nozzle throat but to the rear thereof, a projecting annular boss of rounded cross section which is designed to locally change the speed of said cold stream from the subsonic range to the supersonic range and to be the origin of a first characteristic, inclined toward the rear, for said shockwave.

The projecting rounded boss provided by the present invention corresponds to a local reduction in the radius of curvature of said inner fan cowl and hence to an acceleration of the cold stream when passing over said boss, such that the speed of said cold stream changes locally to a supersonic value, thus giving rise to the first characteristic of the shockwave. Furthermore, on account of the curvature of this projecting rounded boss, said first characteristic of the shockwave can be relatively greatly inclined toward the rear with respect to the flow of the cold stream, with the result that the same can apply for the following characteristics. Thus, unlike the known turbofan engines in which the shockwave is formed by abrupt normal shocks, the shockwave in the improved turbofan engine according to the invention consists of oblique shocks resulting in smooth, progressive transitions with intermediate speed values between the supersonic speed zones and the subsonic speed zones. The speed of the cold stream thus tends to be made more uniform and there is a consequent improvement in the performance of the turbofan engine with a simultaneous reduction in the shock cell noise.

It will be noted that, by arranging a projecting boss on the inner fan cowl, the present invention takes a different approach from the prior art which, as referred to above, makes provision for the surface of this cowl to be as smooth as possible, without unevenness, in order to reduce as far as possible the performance losses owing to friction. In fact, the Applicant has found that, at the expense of a small performance loss due to the presence of the projecting rounded boss on the inner fan cowl, it is possible to enjoy a significant increase in turbofan engine performance by replacing the normal shocks of the prior art with the oblique shocks of the present invention.

The first characteristic, originating from said rounded boss, can meet up directly with the slip surface between said external aerodynamic flow and said cold stream and be reflected there. However, it is preferable for said first characteristic to meet the outer fan cowl in order to be reflected there in the form of the second characteristic, likewise inclined toward the rear, of said shockwave. Thus, the inclination of said second characteristic can be influenced by the curvature of said outer fan cowl at the location of the impact of said first characteristic. More advantageously still, in the latter case in which said first characteristic meets the outer fan cowl, provision is made to position said cold-stream outlet orifice at the location of this meeting point, thereby avoiding an excessive length for the cold-stream nozzle and thus allowing savings in terms of mass and drag. The second characteristic thus has its origin at the edge of said cold-stream outlet orifice.

For reasons of directing the reflection which are similar to those given above, it is advantageous for said second characteristic, reflected by the slip surface between said external aerodynamic flow and said cold stream or else by said outer fan cowl, or even by the edge of said cold-stream outlet orifice, to meet the projecting part of said inner fan cowl, which reflects it according to a third characteristic, likewise inclined toward the rear.

By contrast, after initiating the shockwave in the manner mentioned above, said third characteristic can meet the slip surface between the external aerodynamic flow and said cold stream, this slip surface then reflecting said third characteristic in the form of a fourth characteristic, likewise inclined toward the rear. Of course, this fourth characteristic is subsequently reflected on the slip surface between the cold stream and the hot stream, and so on, the following characteristics of said shockwave being reflected alternately on one or other of said slip surfaces.

In a known manner, the inner fan cowl of the turbofan engine can comprise at least one ventilation opening intended to expel, into said cold stream, a stream of ventilation air bled from the latter and designed to regulate the temperature of said central hot-stream generator. As is obvious, this stream of ventilation air disturbs the cold stream in the vicinity of said inner fan cowl, and also the slip surface between said hot and cold streams. Hence, in this case, it is advantageous for said second characteristic to be reflected on said inner fan cowl in front of said ventilation opening. Thus, the stream of ventilation air is mixed with a cold stream from which normal shocks have already been removed, thereby minimizing the disturbances which it may bring.

The present invention also relates to a method for improving the performance of a turbofan engine for an aircraft, of the type described above. Such a method is noteworthy in that, in the vicinity of said nozzle throat but to the rear thereof, there is formed, on said inner fan cowl and around said longitudinal axis, a projecting annular boss having a rounded cross section and designed to locally change the speed of said cold stream from the subsonic range to the supersonic range and to be at the origin of a first characteristic, inclined toward the rear, for said shockwave.

BRIEF DESCRIPTION OF THE DRAWINGS

The figures in the appended drawing will make it clear how the invention can be implemented. In these figures, identical references denote like elements.

DETAILED DESCRIPTION OF THE INVENTION

Figure 1:
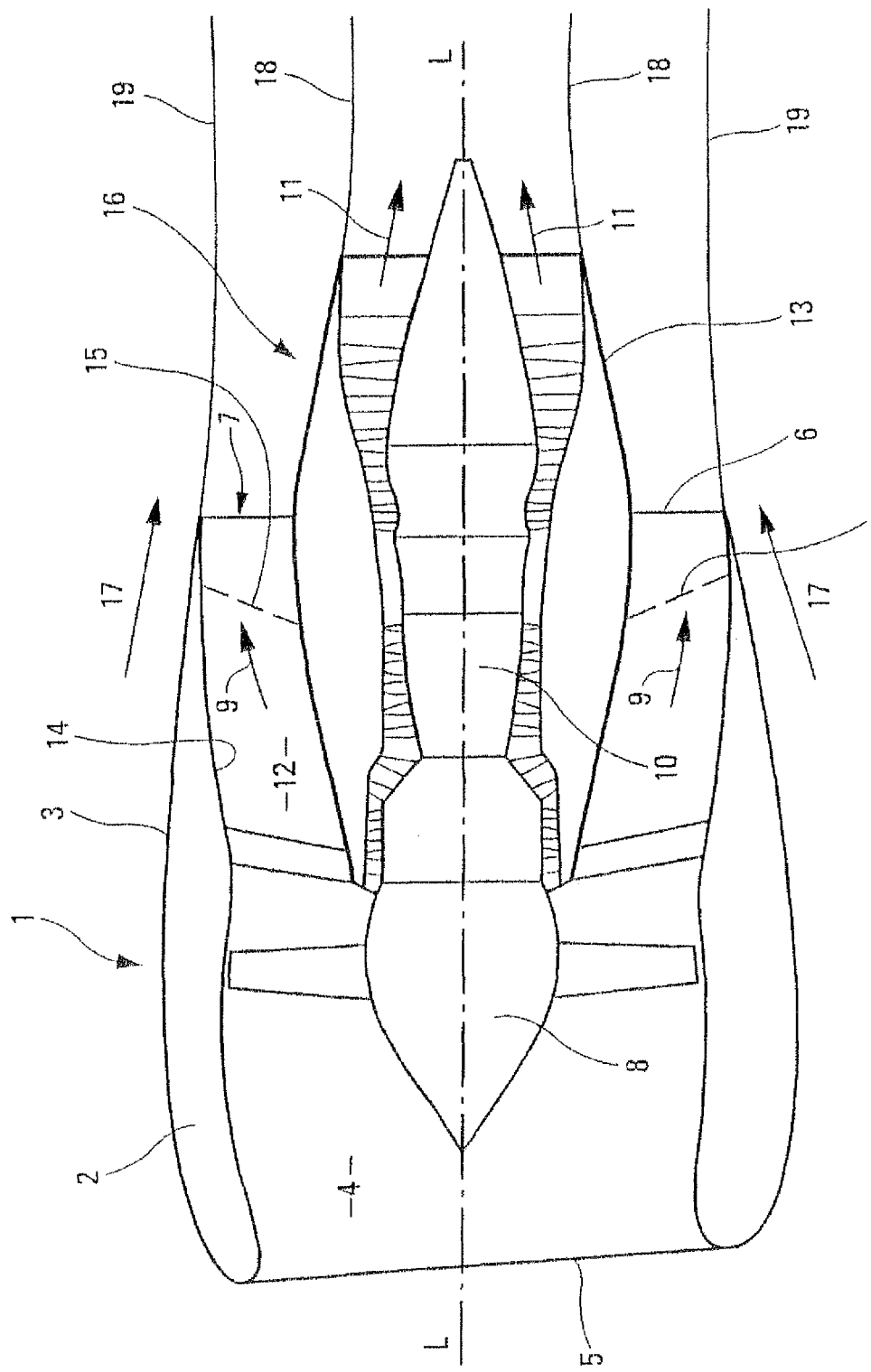
FIG. 1 represents, in schematic axial section, a known turbofan engine to which the present invention can be applied.

The turbofan engine 1, of longitudinal axis L-L, shown in FIG. 1, comprises a nacelle 2 bounded externally by an outer nacelle cowl 3.

The nacelle 2 comprises, at the front, an air inlet 4 provided with a leading edge 5 and, at the rear, an air outlet orifice 6 provided with a trailing edge 7.

Inside said nacelle 2 are arranged:
a fan 8 directed toward the air inlet 4 and able to generate the cold stream 9 for the turbofan engine 1;
a central generator 10 comprising, in a known manner, low-pressure and high-pressure compressors, a combustion chamber and low-pressure and high-pressure turbines, and generating the hot stream 11 of said turbofan engine 1; and
an annular cold-stream duct 12 formed around said central generator 10, between an inner fan cowl 13 arranged in the region of the central generator 10 and an outer fan cowl 14 arranged in the region of the outer nacelle cowl 3.

The inner and outer fan cowls 13 and 14 between them form a nozzle for said cold stream 9, the neck 15 of which nozzle is indicated by a chain line in FIG. 1.

The outer fan cowl 14 converges, toward the rear of the turbofan engine 1, in the direction of said outer nacelle cowl 3 so as to form with the latter the edge 7 of said orifice 6, which thus constitutes the outlet orifice for the cold stream.

Moreover, on the rear side of the turbofan engine 1, said inner fan cowl 13 forms a projection 16 with respect to said outer fan cowl 14, said projection 16 being outside said cold-stream outlet orifice 6.

When the aircraft (not shown) which carries the turbofan engine 1 is moving, an external aerodynamic flow 17 flows around the nacelle 2, while the cold stream 9 and the hot stream 11 are ejected through the orifice 6 and through the central generator 10, respectively: thus, the cold stream 9 surrounds the hot stream 11 and is itself surrounded by the aerodynamic flow 17. There is thus formed a slip surface 18 between the cold stream 9 and the hot stream 11, and also a slip surface 19 between said external aerodynamic flow 17 and said cold stream 9.

As mentioned above, an alternating succession of supersonic speed zones and subsonic speed zones separated from one another by normal shocks (not shown) occurs in the cold stream 9.

Figure 2:
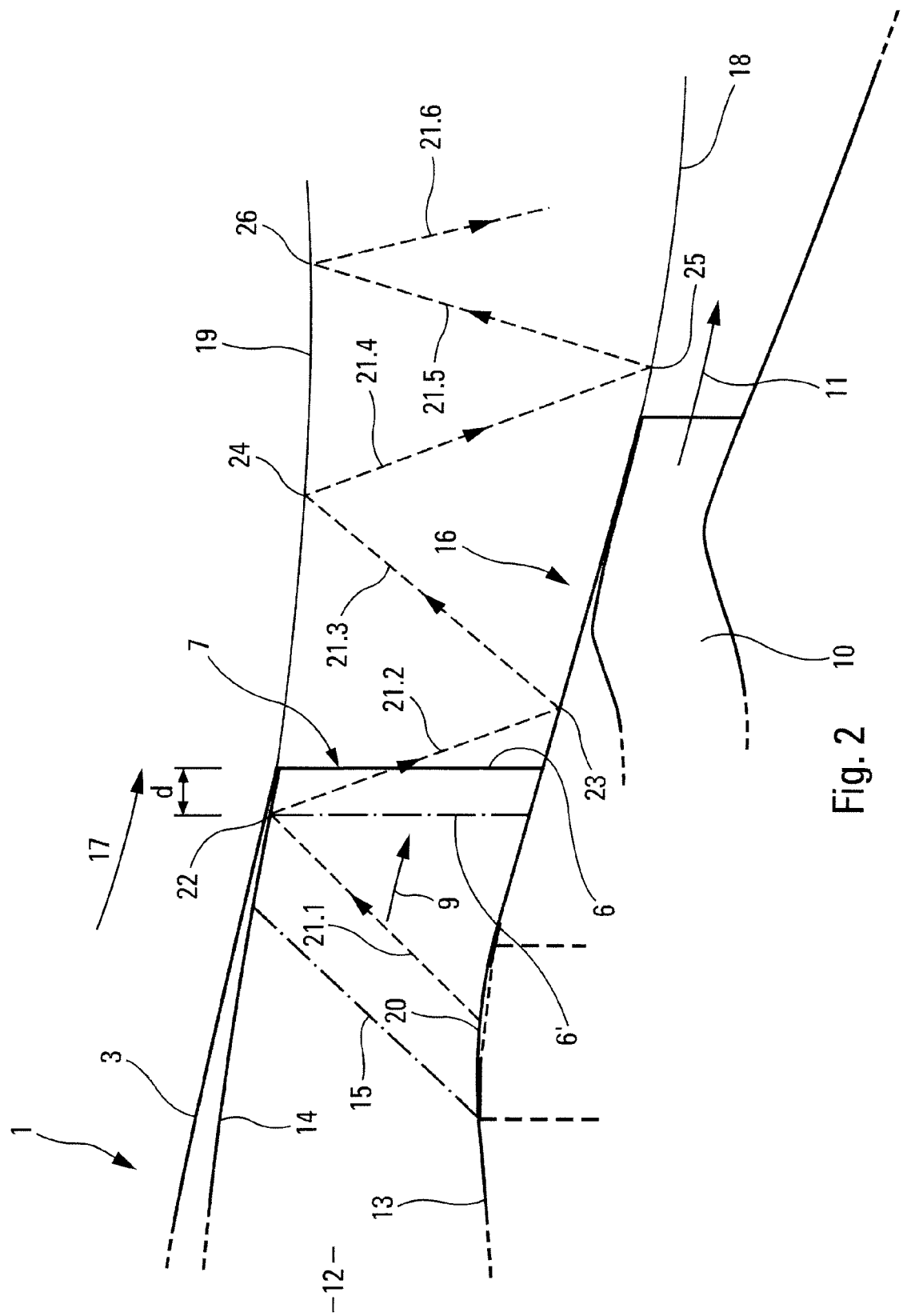
FIG. 2 illustrates, in an enlarged schematic part view, the turbofan engine rear part in FIG. 1 as improved according to the present invention.
Figure 4:
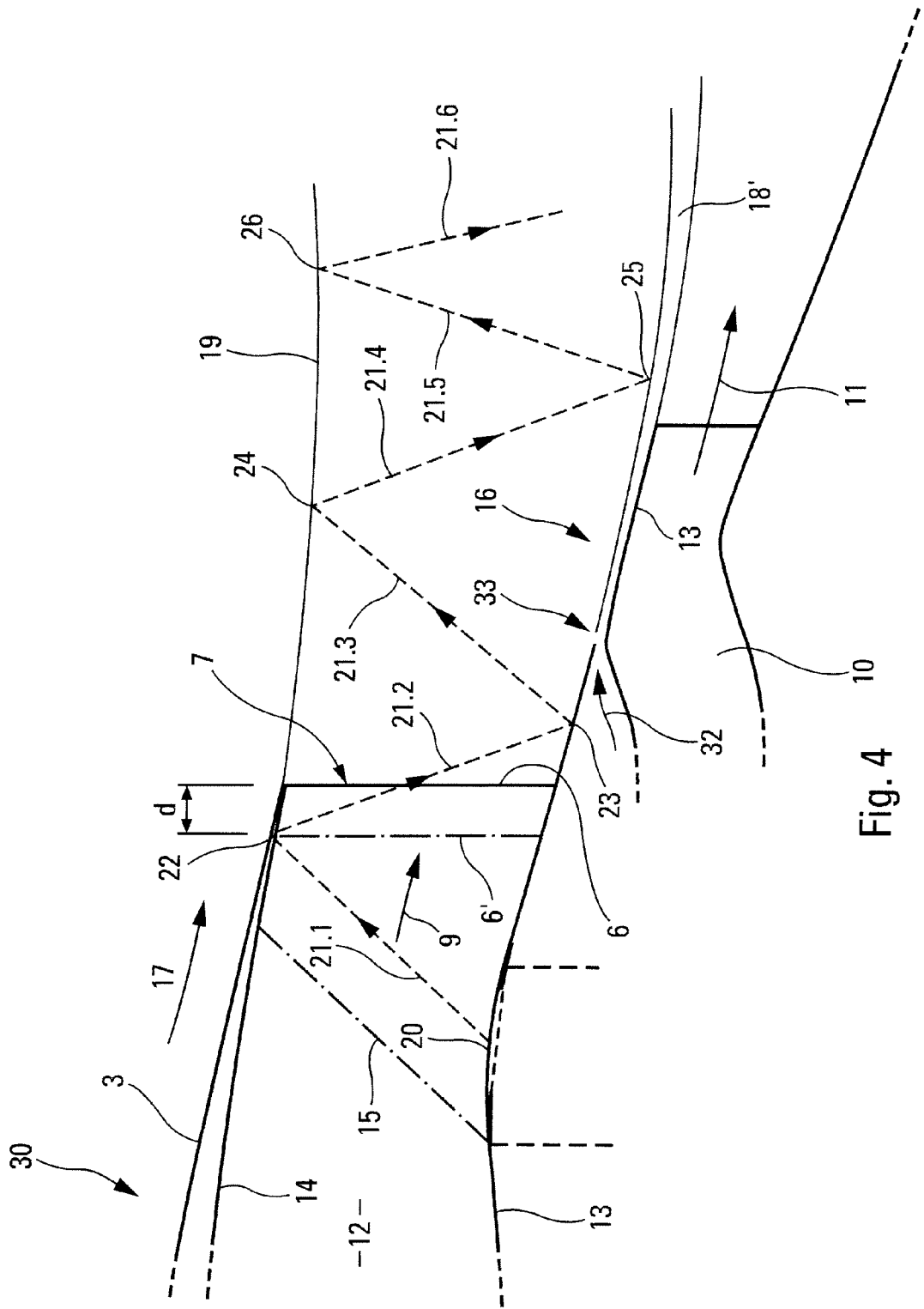
FIG. 4 illustrates, in an enlarged schematic part view, the turbofan engine rear part in FIG. 3 as improved according to the present invention.

To solve this problem, according to the present invention, the inner fan cowl 13 comprises, around the longitudinal axis L-L and in the vicinity of the nozzle throat 15, but to the rear of the latter, a projecting annular boss 20 of rounded cross section which is designed to locally change the speed of the cold stream 9 from the subsonic range to the supersonic range (see FIG. 2). This results in the generation of a first oblique shock characteristic 21.1 which is inclined toward the rear and has its origin at said boss 20. The optimized smooth shape that said inner fan cowl 13 should have so as to reduce as far as possible the performance losses due to friction in said annular cold-stream duct 12 are represented in this FIG. 2 (and also in FIG. 4 below) by means of dashes below said projecting annular boss 20.

In the example represented in FIG. 2, the first characteristic 21.1 is reflected on the outer fan cowl 14 at a location 22 arranged in front of the outlet orifice 6 for the cold stream 9, giving rise to the second oblique shock characteristic 21.2. The latter, likewise inclined toward the rear, is directed toward the projecting part 16 of the inner fan cowl 13 and is reflected there at 23, giving rise to the third oblique shock characteristic 21.3. This third characteristic 21.3 is returned toward the rear in the direction of the slip surface 19 and is reflected there at 24. From there, a fourth oblique shock characteristic 21.4, directed toward the rear, arises and is directed toward the slip surface 18, which it impinges at 25 and is converted in the process into a fifth oblique shock characteristic 21.5, reflected toward the rear, and reaching the slip surface 19 at 26 so as to generate there a sixth oblique shock characteristic 21.6, inclined toward the rear and directed toward the sheer surface 18.

In exactly the same way as the oblique shock characteristics 21.4, 21.5, 21.6, the following oblique characteristics (not shown) are reflected alternately on the slip surface 18 and on the slip surface 19.

FIG. 2 shows the cold-stream outlet orifice 6 to the rear of the location 22 at which the first characteristic 21.1 meets the outer fan cowl 14. Of course, this orifice 6 could occupy the position 6' passing through said location 22, such that the second characteristic 21.2 would have its origin at the edge 7 of the orifice 6 in position 6'.

The nozzle for the cold stream 9 would then be shortened by the length d.

Figure 3:
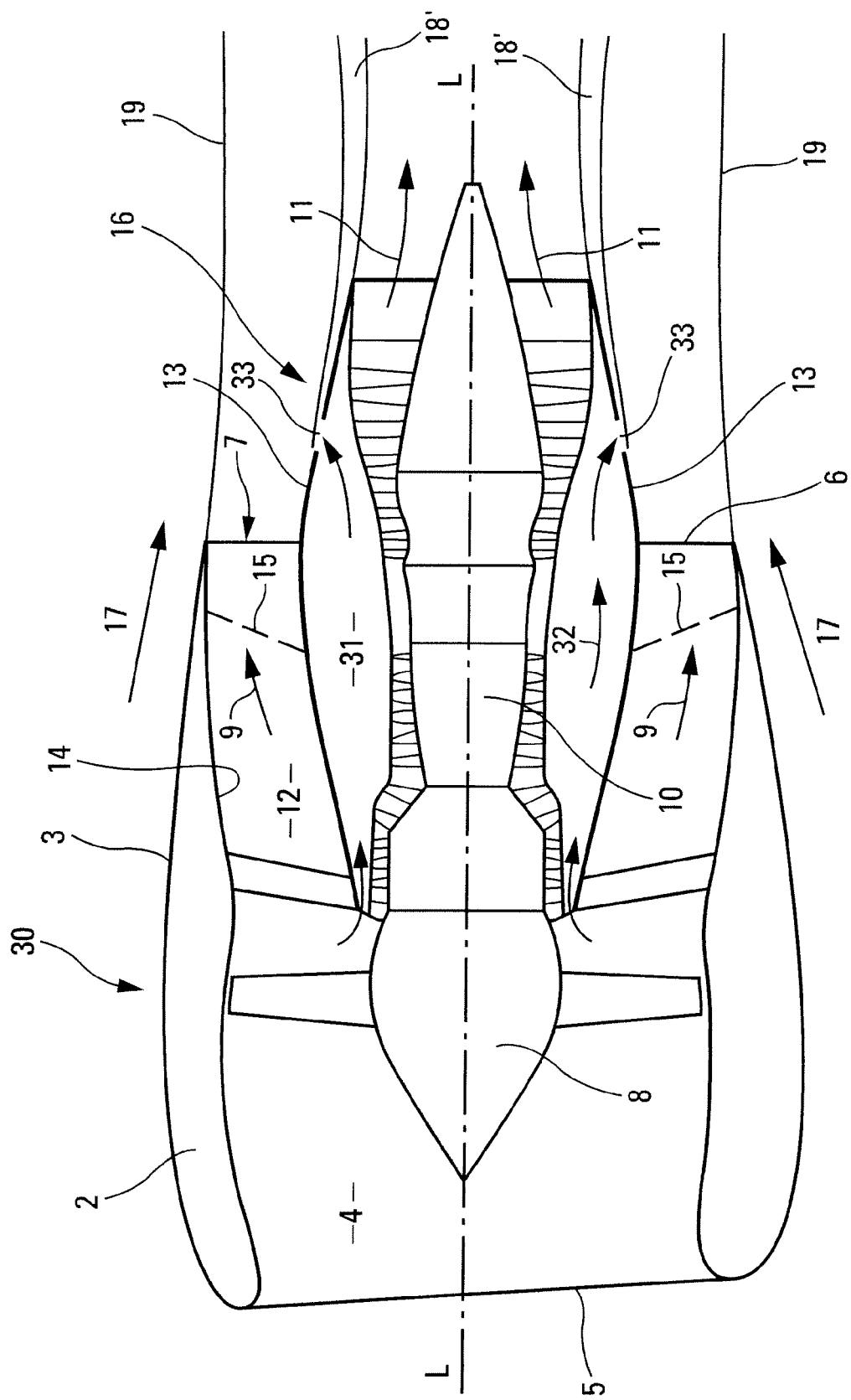
FIG. 3 represents, in schematically axial section, another known turbofan engine to which the present invention can be applied.

In the turbofan engine 30, shown in FIG. 3, all the elements 2 to 17, 19 to 26, 6' and d described in relation to FIGS. 1 and 2 with regard to the turbofan engine 1 reappear in an identical manner. However, in the turbofan engine 30, the annular chamber 31 bounded between the inner fan cowl 13 and the central generator 10 is exploited to regulate the temperature of said generator. For this purpose, fresh air from the fan 8, depicted by the arrows 32, is bled at the front of said chamber 31 and expelled at its rear through at least one ventilation opening 33 made in the inner fan cowl 13. As a result, the ventilation air 32 exiting through the opening 33 is mixed first of all with the cold stream 9 and then with the hot stream 11, such that the slip surface 18 is thickened as represented at 18' in FIGS. 3 and 4.

Moreover, as is apparent from the latter figure, provision is made for the point of reflection 23 on the inner fan cowl 13, between the second and third characteristics 21.2 and 21.3, to be situated in front of said ventilation opening 33. Thus, the ventilation air 32 is mixed with a cold stream 9 from which normal shocks have already been removed.

The invention claimed is:

1. A method for reducing shock cell noise from shockwaves produced by a turbofan engine of an aircraft,
   wherein the turbofan engine is configured around a longitudinal axis and comprises:
   a nacelle, with said nacelle having an outer nacelle cowl;
   a fan, enclosed by said nacelle, and configured to generate a flow of a cold stream;
   a central hot-stream generator, enclosed by said nacelle, and configured to generate a flow of a hot stream;
   an annular cold-stream duct around said central hot-stream generator;
   an outer fan cowl bound about said annular cold-stream duct and in proximity to said outer nacelle cowl;
   a cold-stream outlet orifice with an edge that forms a trailing edge of said nacelle, wherein said outer nacelle cowl and said outer fan cowl converge to meet one another to constitute the cold-stream outlet orifice;
   an inner fan cowl bounding said annular cold-stream duct in proximity to said central hot-stream generator, wherein said inner fan cowl comprises a projecting part that extends toward a rear portion of said turbofan engine outside said cold-stream outlet orifice, and the inner fan cowl has a smooth shape to minimize performance losses due to friction generated from the flow of said cold stream in said annular cold-stream duct;
   an annular boss of rounded cross section, which projects from of said inner fan cowl; and
   a cold-stream nozzle throat between said inner fan cowl and said outer fan cowl,
   said method comprising the steps of:
   flowing an external aerodynamic flow around the nacelle, while the cold stream and the hot stream are ejected through the cold-stream outlet orifice and the central hot-stream generator, respectively, with a first slip surface formed between said external aerodynamic flow and said cold stream flow and a second slip surfaced formed between the cold stream flow and the hot stream flow, and
   changing speed of said cold stream from a subsonic range to a supersonic range to generate a succession of shockwave characteristics comprised of oblique shock characteristics, which propagate toward a rear portion of said turbofan engine and reflect alternatingly between the first slip surface and the second slip surface at speed values between supersonic speed and subsonic speed,
   wherein
   the speed of said cold stream flow is changed from the subsonic range to the supersonic range at the annular boss to originate a first oblique shock characteristic of the succession of shockwave characteristics at the annular boss, with the shockwave characteristics being propagated in a direction inclined from the origination at the annular boss toward the rear portion of the turbofan engine, wherein said first oblique shock characteristic is reflected by said outer fan cowl to produce a second oblique shock characteristic of said succession of shockwave characteristics, with the second oblique shock characteristic being reflected at a location along said outer fan cowl where said cold-stream outlet is placed, inclined in direction from the location of the reflection toward the rear portion of the turbofan engine, and
   a stream of ventilation air is bled from at least one ventilation opening of the inner fan cowl and is expelled into said cold stream to regulate temperature of said central hot-stream generator, and said second oblique shock characteristic is reflected toward said inner fan cowl, in front of said ventilation opening.

2. The method as claimed in claim 1,
   wherein said first oblique shock characteristic is directed toward said outer fan cowl at said cold-stream outlet orifice, with said second oblique shock characteristic originating at an edge of said cold-stream outlet orifice.

3. The method as claimed in claim 1,
   wherein said second oblique shock characteristic is directed toward the projecting part of said inner fan cowl, and the second oblique shock characteristic is reflected from the projecting part as a third oblique shock characteristic of the of the succession of shockwave characteristics, with the third oblique shock characteristic being inclined from reflection toward the rear portion of the turbofan engine.

4. The method as claimed in claim 3,
   wherein said third oblique shock characteristic is reflected toward the first slip surface, with the third oblique shock characteristic being reflected from the first slip surface in the form of a fourth oblique shock characteristic of the of the succession of shockwave characteristics, and the fourth oblique shock characteristic is reflected in an inclined direction toward the rear of the turbofan engine.

* * * * *